United States Patent
Georgiou et al.

(10) Patent No.: US 10,236,027 B1
(45) Date of Patent: Mar. 19, 2019

(54) DATA STORAGE USING LIGHT OF SPATIALLY MODULATED PHASE AND POLARIZATION

(71) Applicant: Microsoft Technology Licensing, LLC, Redmond, WA (US)

(72) Inventors: Andreas Georgiou, Cambridge (GB); Joel Steven Kollin, Seattle, WA (US); James Hilton Clegg, Cambridge (GB); Patrick Neil Anderson, Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/894,778

(22) Filed: Feb. 12, 2018

(51) Int. Cl.
| | |
|---|---|
| G11B 7/00 | (2006.01) |
| G11B 7/127 | (2012.01) |
| G11B 11/105 | (2006.01) |
| G11B 7/0065 | (2006.01) |
| G02B 27/10 | (2006.01) |
| G11B 7/1372 | (2012.01) |

(52) U.S. Cl.
CPC .......... G11B 7/127 (2013.01); G02B 27/1046 (2013.01); G11B 7/0065 (2013.01); G11B 7/1372 (2013.01); G11B 11/10532 (2013.01)

(58) Field of Classification Search
None
See application file for complete search history.

(56) References Cited

U.S. PATENT DOCUMENTS

| | | | | |
|---|---|---|---|---|
| 4,751,659 | A | * | 6/1988 | Hecht ................ G06K 15/1261 347/142 |
| 5,535,029 | A | | 7/1996 | Clark |
| 5,543,251 | A | | 8/1996 | Taylor |
| 5,661,577 | A | | 8/1997 | Jenkins et al. |
| 5,844,700 | A | | 12/1998 | Jeganathan et al. |
| 6,266,167 | B1 | | 7/2001 | Klug et al. |
| 6,293,898 | B1 | | 9/2001 | Yang |

(Continued)

FOREIGN PATENT DOCUMENTS

| | | |
|---|---|---|
| CN | 102621823 A | 8/2012 |
| EP | 1186939 A2 | 3/2002 |
| EP | 2264839 A2 | 12/2010 |

OTHER PUBLICATIONS

Georgiou, et al., "Multi-Beam Optical System for Fast Writing of Data on Glass", Application as Filed in U.S. Appl. No. 15/699,597, filed Sep. 8, 2017, 40 Pages.

(Continued)

*Primary Examiner* — Peter Vincent Agustin
(74) *Attorney, Agent, or Firm* — Alleman Hall Creasman & Tuttle LLP

(57) ABSTRACT

An optical data-storage system comprises a laser, an imaging optic, and associated computer logic. The laser is configured to emit a pulsed wavefront having uniform phase and polarization. The imaging optic is configured to modulate the phase and polarization of different portions of the wavefront by different amounts, and to diffract light from the different portions to a substrate with writeable optical properties. The logic is configured to receive data and to control modulation of the phase and polarization such that the light diffracted from the imaging optic writes the data to the substrate.

17 Claims, 10 Drawing Sheets

(56) References Cited

U.S. PATENT DOCUMENTS

| | | | |
|---|---|---|---|
| 6,373,806 | B1 | 4/2002 | Kitamura et al. |
| 6,483,735 | B1* | 11/2002 | Rentzepis ............ B82Y 10/00 365/119 |
| 6,608,774 | B1* | 8/2003 | Rentzepis ............ B82Y 10/00 365/119 |
| 6,710,901 | B2 | 3/2004 | Pastor |
| 6,897,433 | B2 | 3/2005 | Itoh et al. |
| 6,999,397 | B2 | 2/2006 | Roh et al. |
| 7,200,097 | B2 | 4/2007 | Meyrueis et al. |
| 7,502,157 | B1 | 3/2009 | Dueweke |
| 7,733,557 | B2 | 6/2010 | Handschy et al. |
| 8,605,561 | B2 | 12/2013 | Gladney et al. |
| 8,630,322 | B2* | 1/2014 | Dantus ................. H01S 3/0057 372/24 |
| 8,808,944 | B2 | 8/2014 | Lawrence et al. |
| 9,474,143 | B2 | 10/2016 | Zhan et al. |
| 9,734,858 | B2 | 8/2017 | Barada et al. |
| 2001/0017721 | A1* | 8/2001 | Hait ....................... H04J 14/02 14/2 |
| 2003/0099264 | A1* | 5/2003 | Dantus ............... G01N 21/6402 372/25 |
| 2005/0180291 | A1 | 8/2005 | Ogasawara |
| 2006/0065820 | A1* | 3/2006 | Nagai ................. G01R 33/032 250/225 |
| 2006/0280094 | A1 | 12/2006 | Tsukagoshi et al. |
| 2007/0139586 | A1 | 6/2007 | Gu et al. |
| 2007/0195389 | A1* | 8/2007 | Scheibenstock ..... G03H 1/0808 359/9 |
| 2008/0254372 | A1 | 10/2008 | Wu |
| 2009/0015889 | A1* | 1/2009 | Fuchikami ........... G02F 1/0327 359/11 |
| 2009/0207710 | A1 | 8/2009 | Ayres et al. |
| 2009/0303571 | A1* | 12/2009 | Sandstrom .......... G02B 5/1809 359/291 |
| 2010/0046050 | A1 | 2/2010 | Kroll et al. |
| 2010/0118219 | A1 | 5/2010 | Leister |
| 2010/0125356 | A1 | 5/2010 | Shkolnik et al. |
| 2010/0195178 | A1 | 8/2010 | Leister et al. |
| 2011/0094585 | A1 | 4/2011 | Debije et al. |
| 2012/0257197 | A1* | 10/2012 | Feldkhun ........... G01N 21/4795 356/301 |
| 2012/0300608 | A1 | 11/2012 | Masumura |
| 2013/0021545 | A1 | 1/2013 | Song et al. |
| 2013/0278713 | A1* | 10/2013 | Banks .................. G01S 7/4816 348/36 |
| 2014/0009808 | A1 | 1/2014 | Wang et al. |
| 2014/0078878 | A1 | 3/2014 | Tsuyama et al. |
| 2014/0204437 | A1 | 7/2014 | Ayres et al. |
| 2015/0277551 | A1 | 10/2015 | Travis |
| 2016/0238532 | A1* | 8/2016 | Freudiger .......... G01N 21/6402 |
| 2017/0082546 | A1* | 3/2017 | Dake ................. G01N 21/6458 |
| 2017/0293259 | A1* | 10/2017 | Ochiai ................ G03H 1/0005 |

OTHER PUBLICATIONS

Granger, Charles E, "Polarization Control of Light with a Liquid Crystal Display Spatial Light Modulator", In Thesis of Faculty of San Diego State University, 2013, 80 Pages.

Kumar, et al., "Making an optical vortex and its copies using a single spatial light modulator", In Journal of Physics Letters A, vol. 375, Aug. 22, 2011, pp. 3634-3640.

Wang, et al., "Generation of perfect polarization vortices using combined gratings in a single spatial light modulator", In Journal of Applied Optics, vol. 56, Issue 27, Sep. 20, 2017, 1 Page.

Wang, et al., "The Polarization Multiplexing Image with a Single Diffractive Optical Element", In Journal of IEEE Photonics, vol. 9, Issue 3, Jun. 2017, 9 Pages.

Zhang, et al., "5D Data Storage by Ultrafast Laser Nanostructuring in Glass", In Proceedings of CLEO: Science and Innovations, Jun. 9, 2013, 2 Pages.

Zhang, et al. "Eternal 5D data storage by ultrafast laser writing in glass", In Proceedings of International Society for Optics and Photonics, vol. 9736, Mar. 4, 2016, 3 Pages.

Zhang, et al. "Fundamentals of phase-only liquid crystal on silicon (LCOS) devices", In Journal of Light: Science and Applications, vol. 3, Oct. 24, 2014, pp. 1-10.

Nolte, S. et al., "Femtosecond waveguide writing: a new avenue to three-dimensional integrated optics," Applied Physics A, Materials Science & Processing, vol. 77, Issue 1, Jun. 2003, 3 pages.

Eng, S. et al., "Optimization of Liquid-Crystal Spatial Light Modulator for Precise Phase Generation", In Proceedings of the Conference on Optoelectronic and Microelectronic Materials and Devices, Dec. 6, 2006, Perth, Australia, 5 pages.

Van Putten, E.G. et al., "Spatial amplitude and phase modulation using commercial twisted nematic LCDs", In Journal of Applied Optics vol. 47, Issue 12, Apr. 20, 2008, pp. 1-13.

Yang, D., "Review of operating principle and performance of polarizer-free reflective liquid-crystal displays", Journal of the Society for Information Display, vol. 16, Iss. 1, Jan. 2008, 3 pages.

Lin, Y. et al., "Polarisation-independent liquid crystal devices", In Journal of Journal Liquid Crystals Today, vol. 17, No. 1-2, Jul. 2008, pp. 2-8.

Lin, Y. et al., "A Polarizer-free Liquid Crystal Display using Dye-doped Liquid Crystal Gels", In Journal of Materials, vol. 2, Oct. 26, 2009, pp. 1662-1673.

Reichelt, S. et al., "Computational hologram synthesis and representation on spatial light modulators for real-time 3D holographic imaging", In Proceedings of the 9th International Symposium on Display Holography (ISDN 2012), Jun. 25, 2012, Cambridge, Massachusetts, USA, 10 pages.

Meneses-Fabian, C. et al., "Polarized light by quadrature amplitude modulation" Journal of Optics and Lasers in Engineering, vol. 51, Iss. 4, Apr. 2013, 2 pages.

Dunayevsky, J. et al., "MEMS Spatial Light Modulator for Phase and Amplitude Modulation of Spectrally Dispersed Light", Journal of Microelectromechanical Systems, vol. 22, No. 5, Oct. 2013, 9 pages.

Zhu, L. et al. "Arbitrary manipulation of spatial amplitude and phase using phase-only spatial light modulators", In Journal of Scientific reports, vol. 4, Dec. 11, 2014, pp. 1-7.

"Phase spatial light modulator LCOS-SLM", In Publication of Hamamatsu, Available as Early as Feb. 26, 2015, 14 pages.

Weng, L. et al., "High-efficiency and fast-switching field-induced tunable phase grating using polymer-stabilized in-plane switching liquid with vertical alignment", Journal of Physics D Applied Physics, vol. 49, No. 12, Feb. 23, 2016, 7 pages.

"Spatial Light Modulators" Holoeye Website, Retrieved Online at http://holoeye.com/spatial-light-moduators/, Dec. 11, 2016, 3 pages.

* cited by examiner

DATA STORAGE USING LIGHT OF SPATIALLY MODULATED PHASE AND POLARIZATION

BACKGROUND

High-power, short-pulse laser irradiance can be used to write and store data within a glass substrate. The irradiance induces a long-lived lattice perturbation at its focus, which derives from non-linear, two-photon absorption by the substrate. In some cases, the lattice perturbation has the optical properties of a nano-grating embedded within the substrate at the point where the irradiance is imaged. Data written to a glass substrate in this manner can be read back using a polarized optical beam to interrogate the various grating-like perturbations formed within it.

SUMMARY

The examples disclosed herein relate to an optical data-storage system, comprising a laser, an imaging optic, and associated computer logic. The laser is configured to emit a pulsed wavefront having uniform phase and polarization. The imaging optic is configured to modulate the phase and polarization of different portions of the wavefront by different amounts, and to diffract light from the different portions to a substrate with writeable optical properties. The logic is configured to receive data and to control modulation of the phase and polarization such that the light diffracted from the imaging optic writes the data to the substrate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
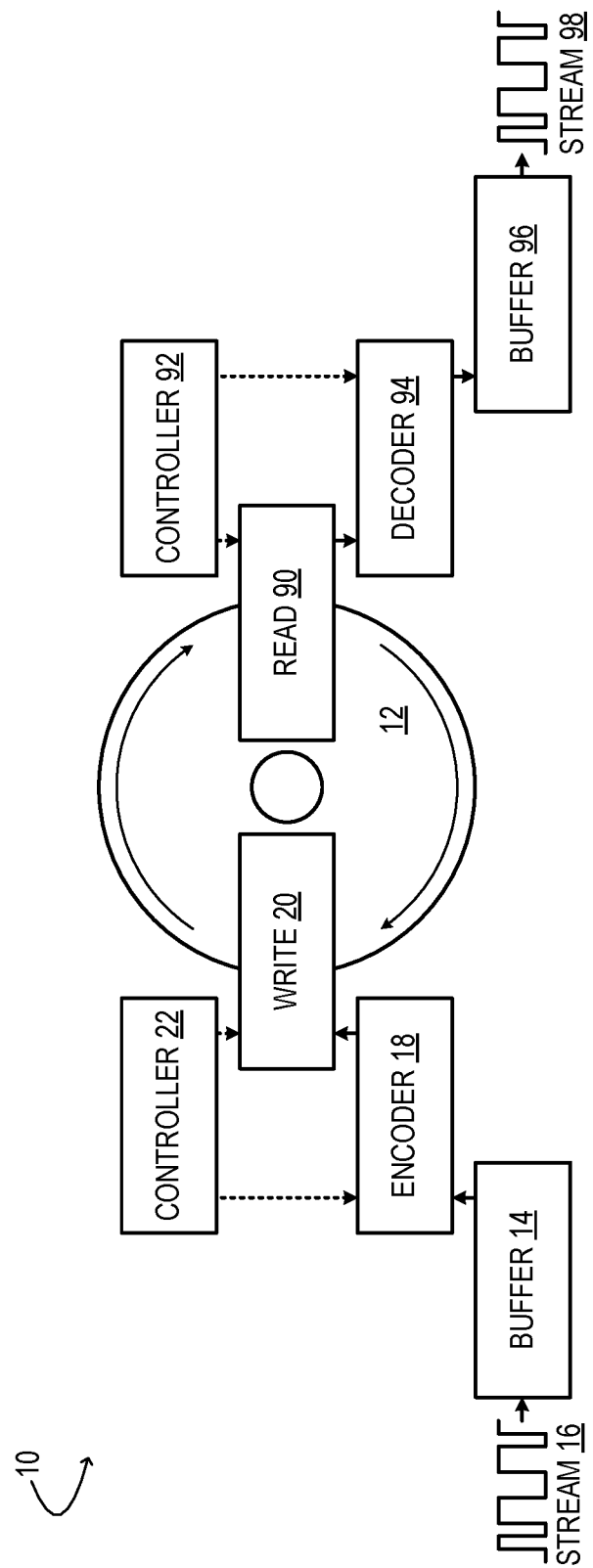
FIG. 1 shows aspects of an example optical data-storage and retrieval system.

This disclosure is presented by way of example, and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

As described above, data can be written to a glass or other solid substrate using high-power, coherent irradiance. The term 'voxel' is used herein to refer to any discrete locus of a substrate where an individual data value (i.e., symbol) may be stored. The data stored in a voxel may take various forms. In principle, any of the Muller-matrix coefficients of the substrate lattice can be manipulated to encode data. In examples using silica glass substrates, the lattice perturbation from focused, polarized irradiance takes the form of a non-native birefringence localized at the focus. Accordingly, each voxel of the substrate may be modeled as a very small waveplate of a retardance $\delta d$ and slow-axis orientation $\phi$. These model parameters may be manipulated independently to write a desired symbol to a given voxel. Here, the polarization angle of the beam determines the slow-axis orientation $\phi$, while the amplitude of the beam determines the strength of the waveplate grating, and therefore the retardance $\delta d$.

By dividing the continuous space of achievable slow-axis orientations and retardances into discrete intervals, multi-bit data values may be encoded into each voxel—viz., by independently coercing the birefringence of that voxel to be within one of the discrete intervals. In this manner, each voxel may encode one of $R \geq 1$ different retardance states at each of $Q \geq 1$ different polarization angles. In some examples, many parallel layers of voxel structures may be written to the same substrate by focusing the laser irradiance to specified depths below the irradiated surface of the substrate. This mode of data storage is referred to as '5D optical storage'.

In order to write data at an acceptably high throughput, numerous voxels may be written in parallel. Although it is possible to write each voxel serially, the required overhead of high-speed, high-precision mechanical movement may make such an approach impractical. To write data in parallel, the output of a high-power laser may be split into a plurality of independently modulated, voxel-sized child beams, so that a corresponding plurality of voxels may be written simultaneously. Each child beam, however, must be rotated to the particular polarization state appropriate for the symbol it writes.

FIG. 1 illustrates the 5D optical approach in schematic detail. FIG. 1 shows aspects of an example optical data storage and retrieval system 10. System 10 is configured to write and store data to substrate 12. The substrate may differ from one example to the next, but generally includes a transparent substrate. In some examples, the substrate may be a polymer. In some examples, the substrate may be an inorganic glass, such as silica glass. In some examples, the substrate may take the form of a relatively thin optical layer (e.g., 30 to 300 microns thick), coupled to a mechanically stable supporting layer. In FIG. 1 and subsequent drawings, the substrate is shown in the form of rotating disk. In other examples, the substrate may be shaped differently—as a translating slab or rotating cylinder, for instance. In some examples, the substrate may be stationary with respect to the optical componentry of system 10. Buffer 14 of system 10 is configured to buffer an input data stream 16 to be written to the substrate. Encoder 18 parses the data from the buffer and provides appropriate control signal to write head 20, such that the data is written according to the desired encoding. Additional aspects of the encoding and write process are controlled by write controller 22, which may take the form of a computer system (vide infra).

Figure 2:
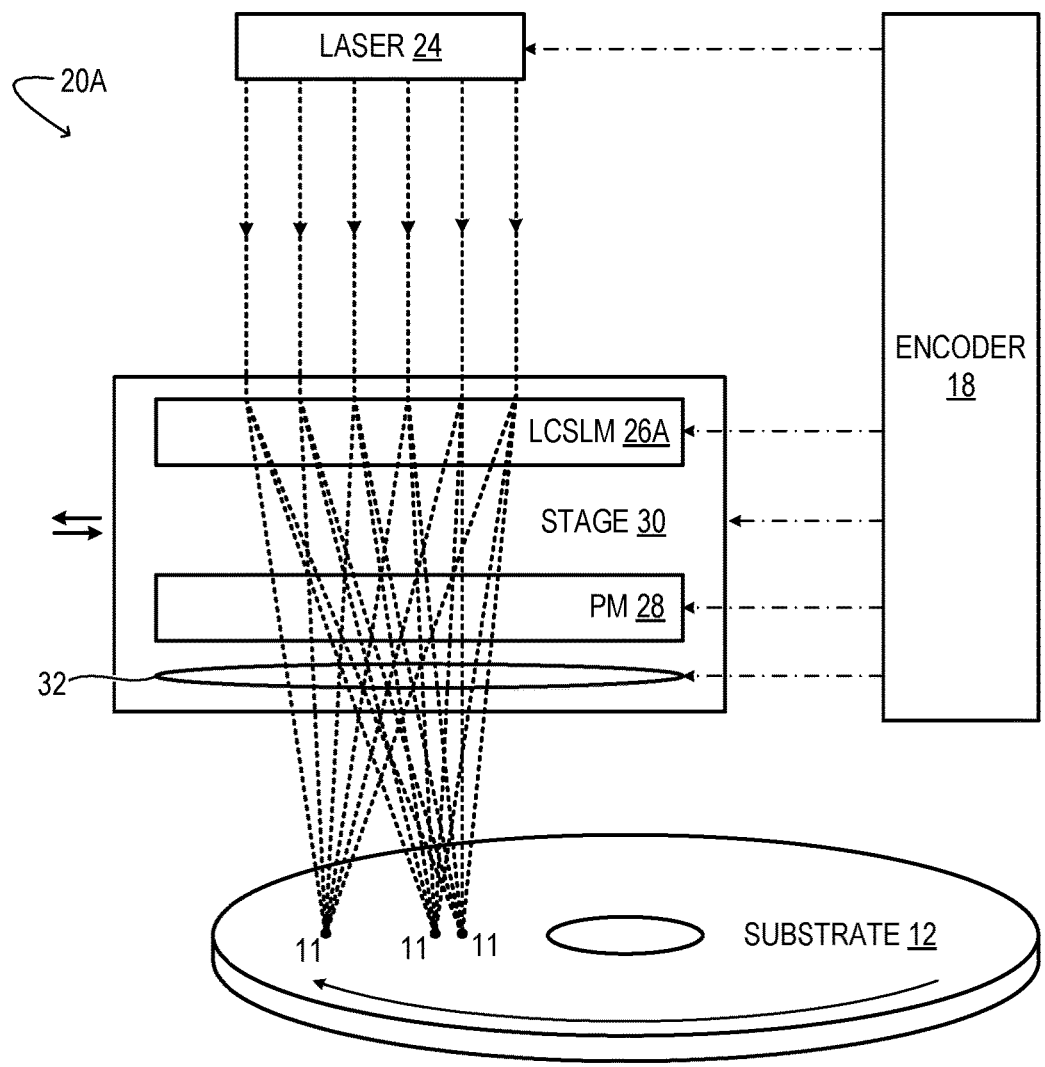
FIG. 2 shows aspects of an example write head of an optical data-storage and retrieval system comprising separate polarization and phase modulation stages.

FIG. 2 shows aspects of an example write head 20A of optical data storage and retrieval system 10. To enable simultaneous, parallel writing, write head 20A includes a high-power, laser 24, an imaging optic in the form of an electronically addressable liquid-crystal spatial light modulator (LCSLM) 26A, and an electronically addressable polarization modulator (PM) 28.

Laser 24 is configured to emit a pulsed wavefront having uniform phase and polarization. The laser may be a femtosecond laser emitting in a narrow wavelength band of fixed (e.g., plane) polarization. Irradiance from the laser may comprise a repeating pulsetrain of sub-picosecond photon pulses—e.g., tens to hundreds of femtoseconds in duration, for example. In some implementations, laser 24 may be one or more of Q-switched and mode-locked, to provide very brief pulses of very high energy. In some cases, shorter wavelengths of a light maybe formed by using optical harmonic generators utilizing non-linear processes. Other forms of laser irradiance are also envisaged.

LCSLM 26A is configured as a dynamic digital hologram. The LCSLM includes an array of pixel elements that receive the wavefront from laser 24. The liquid crystal (LC) within each pixel element imparts a variable phase delay to the irradiance passing through that element. In a state-of-the-art LCSLM, the phase delay is in a unique direction common to all pixel elements of the array. Because each pixel element is independently addressable, the magnitude of the variable phase delay may be controlled down to the pixel level. As with any grating, a phase delay imparted in the near field of the LCSLM creates an interference pattern in the far field, where substrate 12 is positioned. By controlling the near-field phase delay from each pixel element of the LCSLM, the far-field interference pattern may be controlled so as to irradiate each voxel of any layer of the substrate with the desired intensity.

In write head 20A of FIG. 2, the holographic projection from LCSLM 26A passes through PM 28. The PM is a non-imaging active optic configured to rotate, by a controllably variable angle, the polarization state of the holographic projection. To the substrate, therefore, the holographic projection 'appears' as a parallel 2D array of write beams, each having controlled polarization and intensity, and each being mapped to a corresponding voxel of substrate 12. It will be noted that the mapping of LCSLM pixels to write beams (i.e., voxels) is not necessarily a 1:1 mapping, but may be 2:1, 4:1, or 10:1, among other suitable mappings. In some examples, the number of write beams achievable practically is about one-fourth the number of pixels on the LCSLM. For example, with about 10 million LCSLM pixels, one-million or more child beams may be formed. Moreover, the array of write beams may be reconfigured at the full refresh rate of the LCSLM. State-of-the-art LCSLMs employing nematic liquid crystals have refresh rates of the order of 100 frames per second.

In write head 20A, LCSLM 26A and PM 28 are each coupled operatively to encoder 18. To the LCLSM, the encoder provides electronic signal that digitally defines the holographic projection; to the PM, the encoder provides electronic signal that defines the variable rotation applied to the polarization state of the holographic projection.

In some implementations, the array of pixel positions of LCSLM 26A may be grouped into a plurality of non-overlapping or marginally overlapping holographic zones, which are exposed sequentially to the wavefront of laser 24. Each holographic zone may be a two-dimensional area of any desired shape—e.g., rectangular, wedge-shaped, ring-shaped, etc. Accordingly, LCSLM 26A of system 10 may be coupled mechanically to a scanning stage 30, configured to change the relative positioning of the LCSLM versus the laser. In this manner, each of the holographic zones of the LCSLM may be irradiated in sequence. The scanning stage may be translational and/or rotational, and may be advanced a plurality of times (4, 9, 16 times, etc.) for each time that the LCSLM is addressed. This approach effectively multiplies the temporal bandwidth of the LCSLM beyond its maximum refresh rate. Nevertheless, the laser, LCSLM, PM, and substrate may be fixed in position in some examples. In examples in which data is to be written to a plurality of depth layers of substrate 12, write head 20A may include an adjustable objective lens system 32 configured to focus the irradiance of the write beams from the LCSLM to any selected depth layer of the substrate.

In the configuration described above, write head 20A includes a LCSLM 26A in combination with a non-imaging PM 28. As noted above, this LCSLM is used primarily to divide the laser wavefront into the required number of child beams, while the PM sets the rotation of the far-field polarization based on the data to be written. This enables a symbol $S_i$ to be written to each voxel i of the substrate, encoded by the slow-axis angle and retardance of that voxel. The symbol may be expressed as a digital value or bit sequence—e.g., 00, 01, 10, 11. This can be achieved, for example by two different polarization angles and two possible retardance values for each angle. Other ways include the use of four polarization angles and a single retardance value. Naturally, a larger menu of polarization angles and/or retardance values would correspond to a longer bit sequence.

Figure 3:
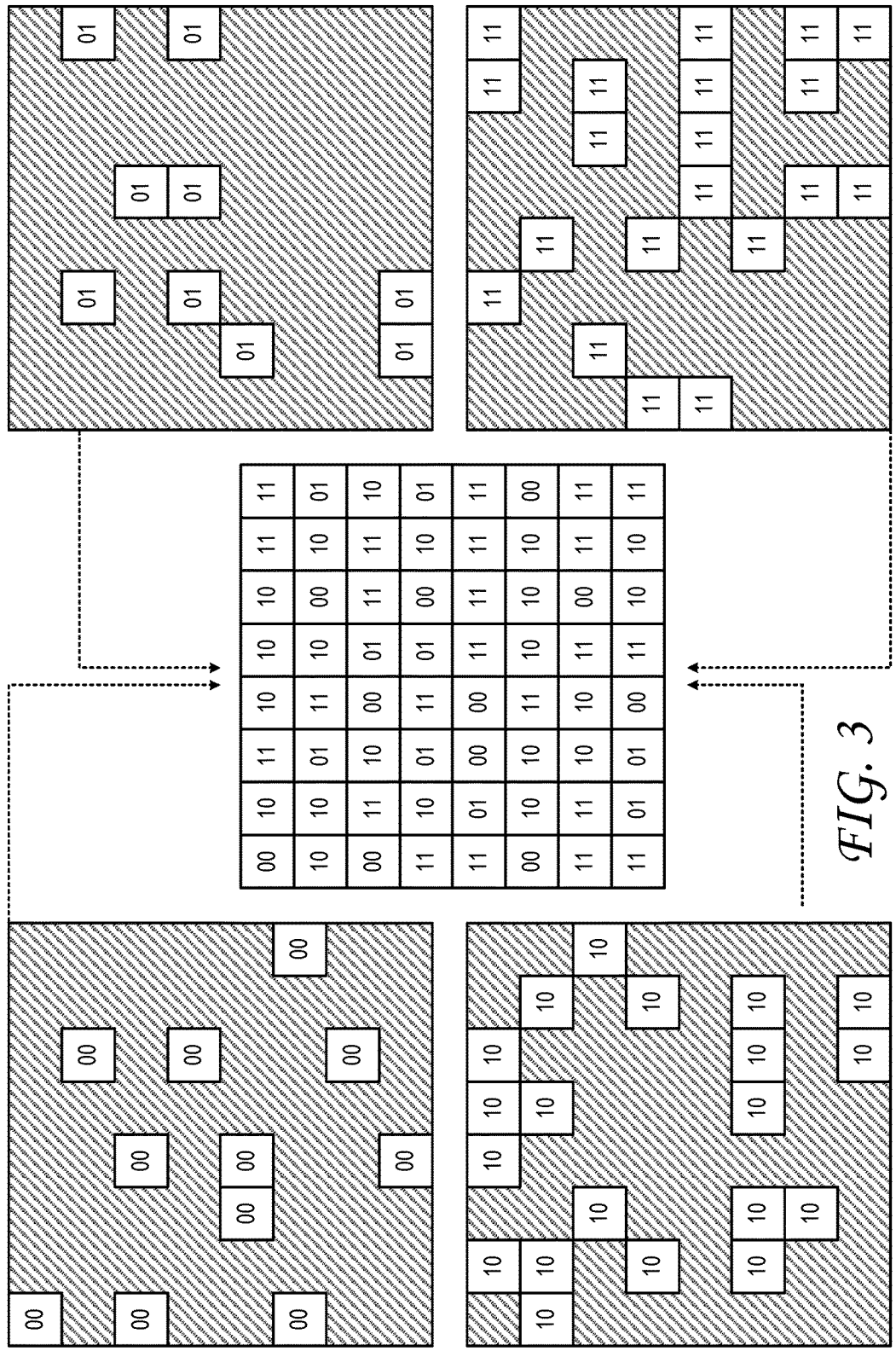
FIG. 3 schematically illustrates an 8×8 voxel sector having four different symbol values written in four consecutive exposures of a substrate, each exposure writing symbols of the same value.

One disadvantage of write head 20A is that for each exposure of substrate 12, all of the voxels written to the substrate must have the same symbol $S_i$. This is shown by example in FIG. 2. Accordingly, if each voxel were to store two bits of information, four different write operations would be required. FIG. 3 illustrates and example sequence of exposures to achieve this, where an 8×8 voxel sector of data is written to the substrate in the likely case where the number of voxels assigned the same symbol is different for each exposure.

To enact the write sequence of FIG. 3, write head 20A would need to compensate, in terms of laser power, for the variable number of voxels written during each exposure. This could be done, for instance, by splitting each of the indicated exposures into two or more smaller exposures, which would reduce throughput. Alternatively, it could be done by over-budgeting the laser power, requiring significant power from every exposure to be wasted. In sum, the unpredictability of the symbol distribution required for each exposure renders write head 20A inefficient in terms of bandwidth and/or optical power utilization.

Thus, described in further detail below are examples related to a modified write head for optical data storage and retrieval system 10 and associated modes of parallel data writing. Briefly, these examples use an LCSLM to divide the laser irradiance into numerous voxel-sized child beams and simultaneously control the polarization of each of the child beams. This is achieved without using multiple active modulators, which would increase cost and complexity and reduce throughput or efficiency, as described above. The modified write head operates based on the principle that shifting a grating or a hologram spatially causes its far field to change phase.

Figure 4:
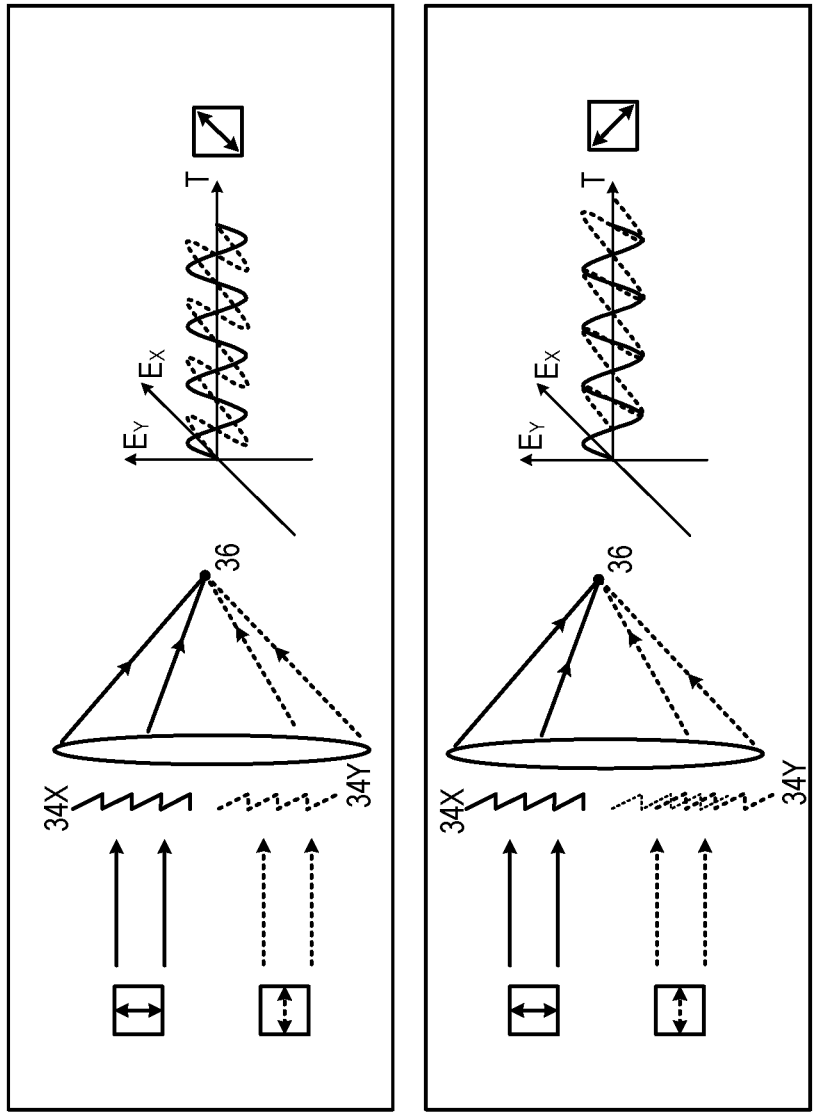
FIG. 4 schematically illustrates the concept of two offset gratings imaging to the same spot on a substrate, each grating contributing far-field polarization as well as phase information.

Conceptually, the present approach is akin to the writing mode illustrated in FIG. 4. FIG. 4 shows a first grating 34X and an adjacent second grating 34Y of the same frequency, or pitch. The two gratings each image the incident wavefront onto a single spot 36, which may correspond to a single substrate voxel. Significantly, if gratings 34X and 34Y are irradiated by light of different polarizations—e.g., the vertical and horizontal plane polarizations indicated by the boxed arrows of FIG. 4—then, by controlling the phase and intensity of the two superimposed beams, the polarization as well as the amplitude of the resultant irradiance of spot 36 may be controlled.

The configuration of FIG. 4 may have certain practical limitations. First, although the beams from gratings 34X and 34Y are coincident at the imaged spot 36, they differ from each other in angle space. Accordingly, as the beam expands again, downstream of 36, the polarization content will again separate. For some data-writing applications, this effect may have undesirable resolution-limiting consequences related to reduction in the effective aperture size and numerical aperture.

One way to address this limitation is to divide grating 34X into numerous component gratings with the same diffraction properties, divide grating 34Y in the same way, and comingle the component gratings over a suitably small length scale. This could be done, for instance, using an LCSLM optoelectronically 'tiled' with alternating portions of gratings 34X and 34Y. Tiles of grating 34X would be irradiated with one polarization state, and tiles of grating 34Y would be illuminated with another polarization state. In this approach, it would be necessary to irradiate different regions of the LCSLM with different polarized beams. In some examples, this may be achieved using a polarization-modulating sheet arranged between the laser and the LCSLM. The polarization-modulating sheet may comprise an alternating tiling of cells arranged in registry with the pixel elements of the array, each cell configured to rotate the polarization of a portion of the wavefront passing through that cell.

Figure 5:
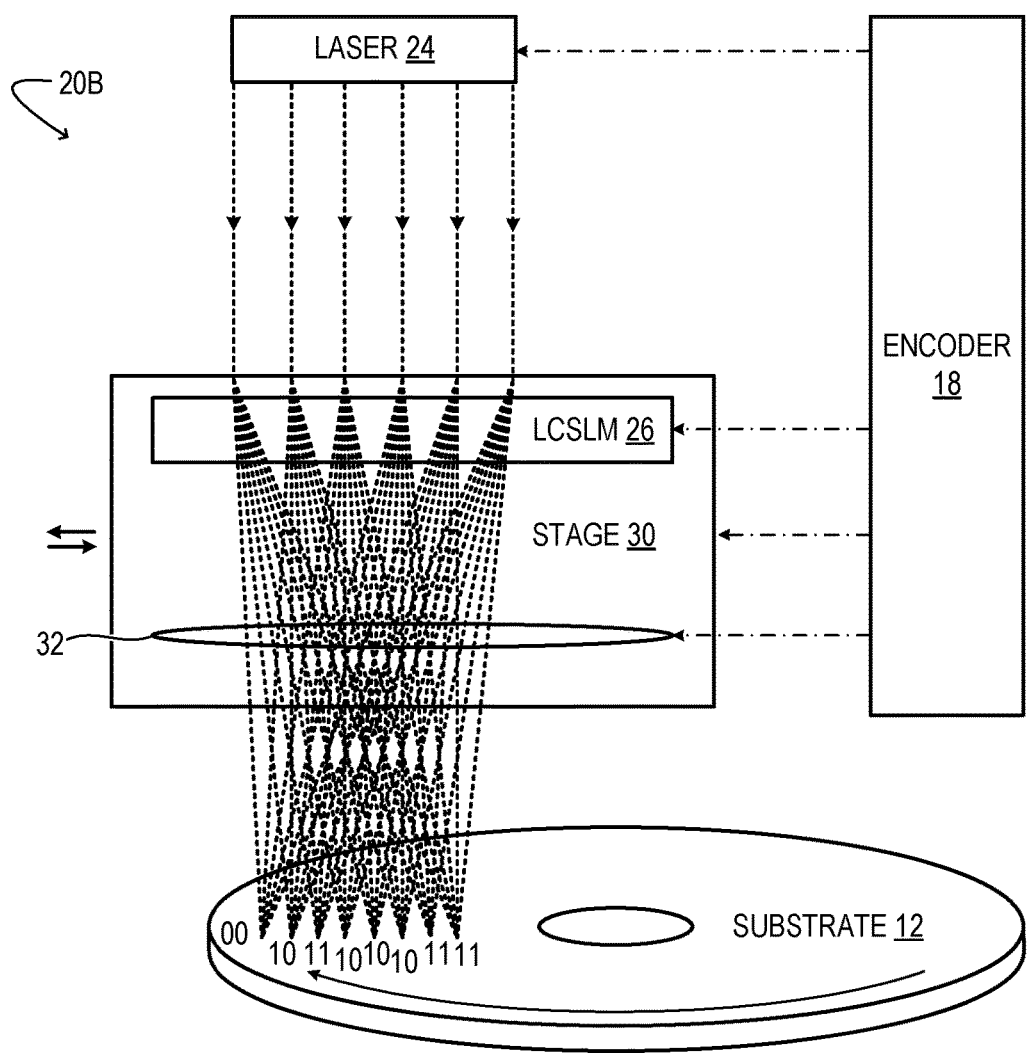
FIG. 5 shows aspects of another example write head of an optical data-storage and retrieval system achieving concerted polarization and phase modulation.

In other examples, to avoid aperture-size reduction, but without requiring piece-wise illumination of the LCSLM, a single LCSLM is used to control both phase and polarization, down to the pixel level. This operation is within the ability of a suitably configured LCSLM, and is enacted by write head 20B of FIG. 5. The array of pixel elements of LCSLM 26 of FIG. 5 is configured to modulate the phase and polarization of different portions of the wavefront by different amounts, and to diffract light from the different portions to a substrate with writeable optical properties. In particular, the LCSLM is configured to modulate the different portions of the wavefront to different near-field polarizations and to image the light to an array of substrate voxels at different far-field polarizations. To this end, the encoder logic is configured to receive data and to control modulation of the phase and polarization such that the light diffracted from the imaging optic writes the data to the substrate. Such data may include inequivalent first and second data values written simultaneously by the light diffracted from the imaging optic. In other words, the first data value may be written to a first voxel by light of a first far-field polarization while the second data value is written to a second voxel by light of a second, inequivalent far-field polarization.

Control of two different parameters may be effected independently or with correlation. Conceptually, the more straightforward mode of controlling both phase and polarization is to control each parameter independently. This may be achieved via an LCSLM in which the various pixel elements are addressable to modulate phase, and independently addressable to modulate polarization. In other words, the LCSLM is configured to provide two independent degrees of freedom in the nematic director. Rotation in one direction affects phase and the other polarization.

Figure 6:
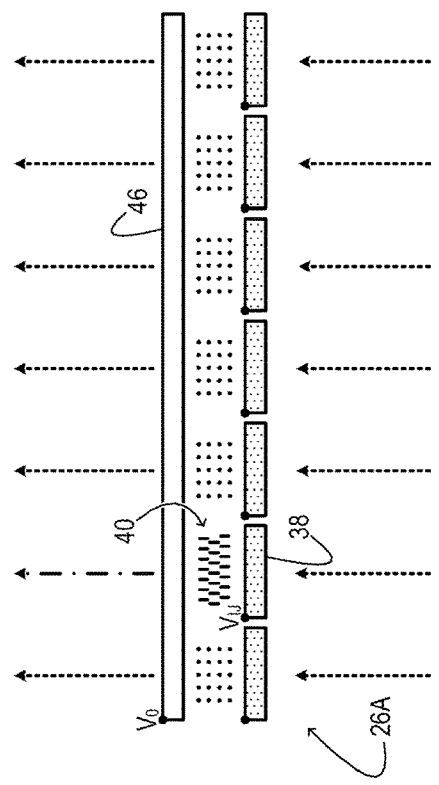

FIG. 6 shows aspects of a state-of-the-art, single-axis LCSLM 26A. The skilled reader will appreciate that a state-of-the-art LC LCSLM includes one independently addressable electrode 38 per pixel element. A controllable voltage $V_{ij}$ is applied to this electrode via a thin-layer transistor (TFT) arranged at the intersection of every row i and column j of pixel elements. $V_{ij}$ controls the magnitude of the external electric field to which the LC molecules 40 of the pixel element are subject. The electric field has a variable magnitude but a fixed direction, which is the same for all pixel elements of the LCSLM array. Accordingly, the electric field orients the LC molecules of a given pixel element in one direction only, to a greater or lesser degree depending on the voltage applied to the electrode. This provides a variable phase delay of the polarization component aligned parallel to the major axis of the oriented LC molecules, which, again, is the same for every pixel element of the array.

Figure 7:
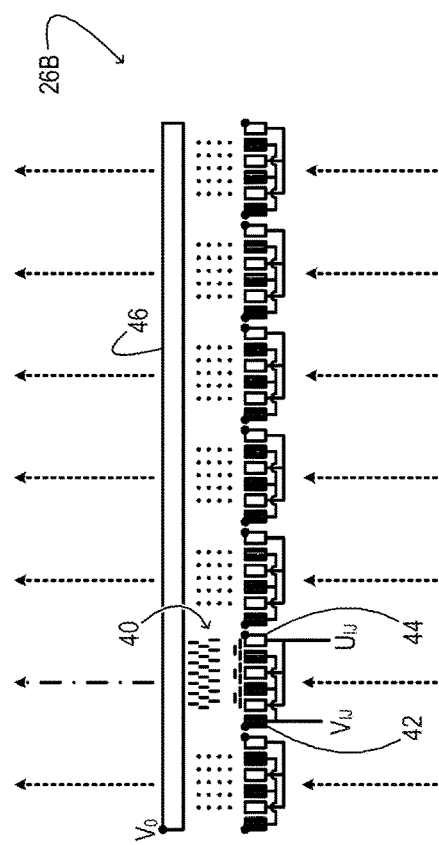
FIGS. 6 and 7 show aspects of example liquid-crystal spatial light modulators (LCSLMs).

In other examples, a modified LCSLM may have two or more independently addressable electrodes per pixel element. An example of such an LCSLM is described in U.S. patent application Ser. No. 15/623,906, which is incorporated by reference. As shown schematically in FIG. 7, the two independently addressable electrodes 42 and 44 of LCSLM 26B are biased independently of the other by a pair of TFTs arranged at each intersection. A first controllable voltage $V_{ij}$ is applied to electrode 42, and a second controllable voltage $U_{ij}$ is applied to electrode 44. In this configuration, the average of $V_{ij}$ and $U_{ij}$, relative to the voltage $V_O$ of common electrode 46 determines the magnitude of the electric field in the transmission direction, while the absolute difference between $V_{ij}$ and $U_{ij}$ determines the magnitude of the electric field in a direction substantially orthogonal to the transmission direction. When voltages $V_{ij}$ and $U_{ij}$ are applied, a controllable portion of the LC molecules align in the transmission direction, and another controllable portion in the orthogonal direction. This condition enables different amounts of phase delay to be imparted independently in two, substantially orthogonal directions. Moreover, these different amounts may be varied from one pixel to the next. In other configurations, independently addressable electrodes may be arranged such that the electric field that orients the LC molecules may have a controllably variable direction as well as a controllably variable magnitude.

In effect, the pixel configuration of modified LCSLM 26B enables each pixel to modulate the phase of the wavefront for X and Y polarization components independently. Thus, if the incoming wavefront is plane polarized, the modified LCSLM can variably rotate as well as variably retard each portion of the wavefront independently, controlled by the voltages $V_{ij}$ and $U_{ij}$ applied to the independently addressable electrodes. In particular, the average voltage applied to the electrodes affects the phase delay of a first component of the portion of the wavefront passing through the associated element, while the differential voltage $V_{ij}$–$U_{ij}$ affects the phase of a non-parallel (e.g., orthogonal) second component of the portion of the wavefront.

As noted above, LCSLM 26B, may be used to achieve independent (i.e., uncorrelated) pixel-wise control of phase and polarization, which lends itself to operationally straightforward, parallel data writing. However, correlated control of these parameters is the basis of another useful data-writing mode. Moreover, correlated control may be achieved using a simpler LCSLM 26A, which provides only one depth-of-field per pixel.

To this end, LCSLM 26A may be programmed to simultaneously project two different, but interrelated holograms: one representing phase retardance for horizontal polarization, the other representing phase retardance for vertical polarization. The required programming may be enacted by the logic of encoder 18, which is configured to execute a holographic-design algorithm to control modulation of the phase and polarization. Generally, the modifications recognize (a) that two different holograms are to be projected from each area of the LCSLM, for modulation of the two polarization states; (b) that each pixel of the LCSLM simultaneously modulates both phase and polarization; and (c) that there may be an infinite number of combinations of spot phases suitable for achieving the desired polarization at a given spot.

Suitable input for the holographic-design algorithm includes the position, polarization, and amplitude for each voxel of an imaged depth layer of the substrate. The algorithm transforms this holographic content into a matrix of scalar electric field components for X and Y polarizations. In doing so, the algorithm optimizes the voltage V(x,y) applied to each pixel element of the LCSLM to minimize the errors in polarization and phase (as no one pixel can provide independent control of polarization and phase).

Figure 8:
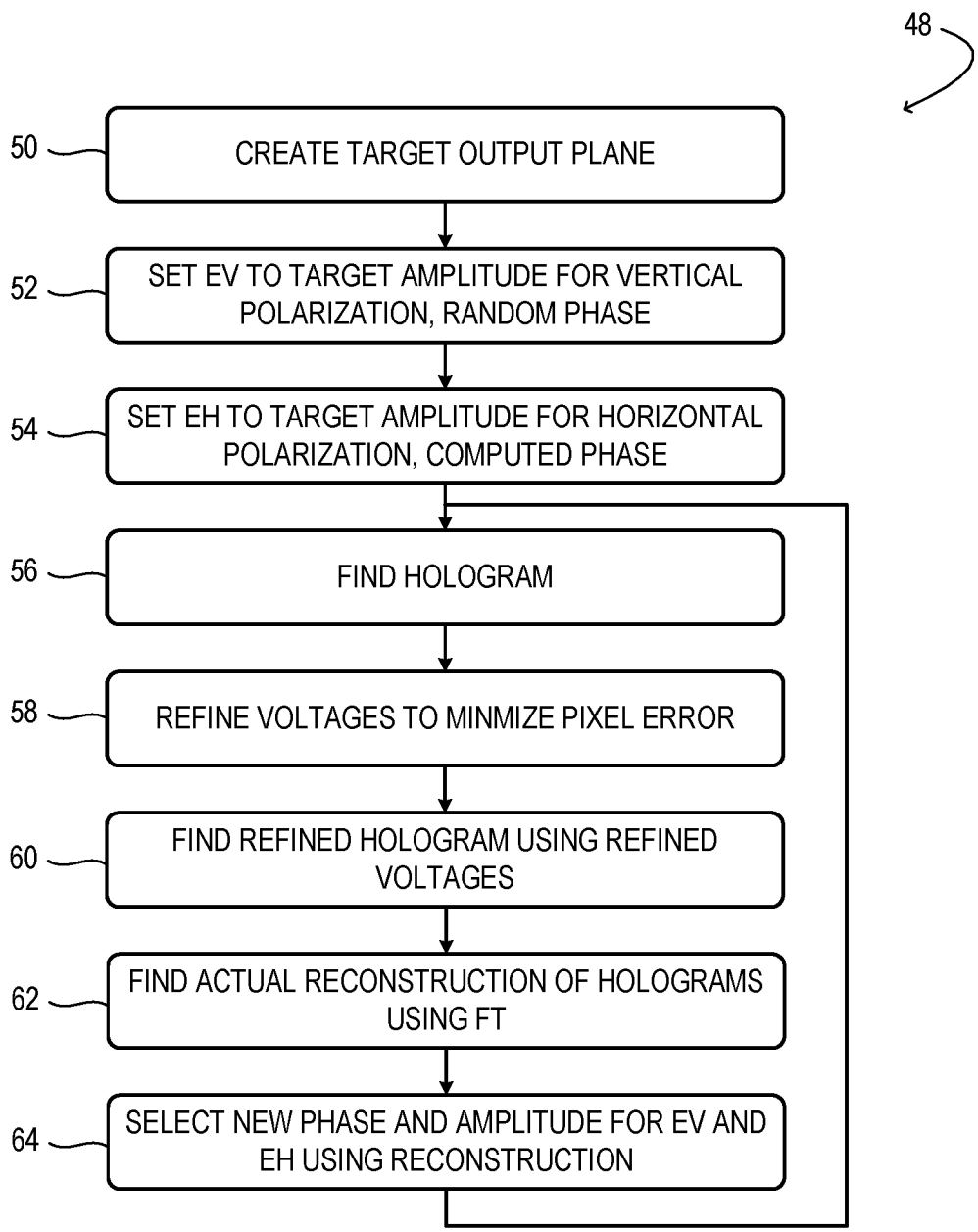
FIGS. 8 and 9 illustrate example holographic-design methods.

FIG. 8 illustrates an example holographic-design method 48 based on a modified Gerchberg-Saxton (GS) algorithm. At 50 of method 48, a target output plane is created. The target output plane consists of the amplitude of the electric field in the horizontal ($|E_{h\_target}|$) and vertical ($|E_{v\_target}|$) polarization states and the phase difference $\Delta\theta_{VH}$ between the two polarization states. At 52 the vertical electric-field amplitude $E_v$ is set equal to the target amplitude for the vertical polarization state, for a randomly selected phase. At 54 the horizontal electric-field amplitude $E_h$ is set equal to the target amplitude for the horizontal polarization, with a phase less than $E_v + \Delta\theta_{VH}$. At 56 a hologram for the two polarization states is found using an inverse Fourier-transform function—viz., $H_h = \text{IFT}(E_h)$, $H_v = \text{IFT}(E_v)$ where IFT stands for Inverse Fourier Transform At 58, for each pixel of $H_h$ and $H_v$, a refined pixel voltage V is found that minimizes the pixel error. At 60 the found holograms are refined to $H_h'$ and $H_v'$ using the selected voltages. At 62 the actual electric-field reconstruction of the two holograms, $E_h'$ and $E_v'$, is found using a Fourier transform (FT). At 64 a new phase and amplitude for $E_v$ and $E_h$ are selected using $E_h'$, $E_v'$, and $\Delta\theta_{VH}$. Execution of method 40 then returns to 56.

Figure 9:
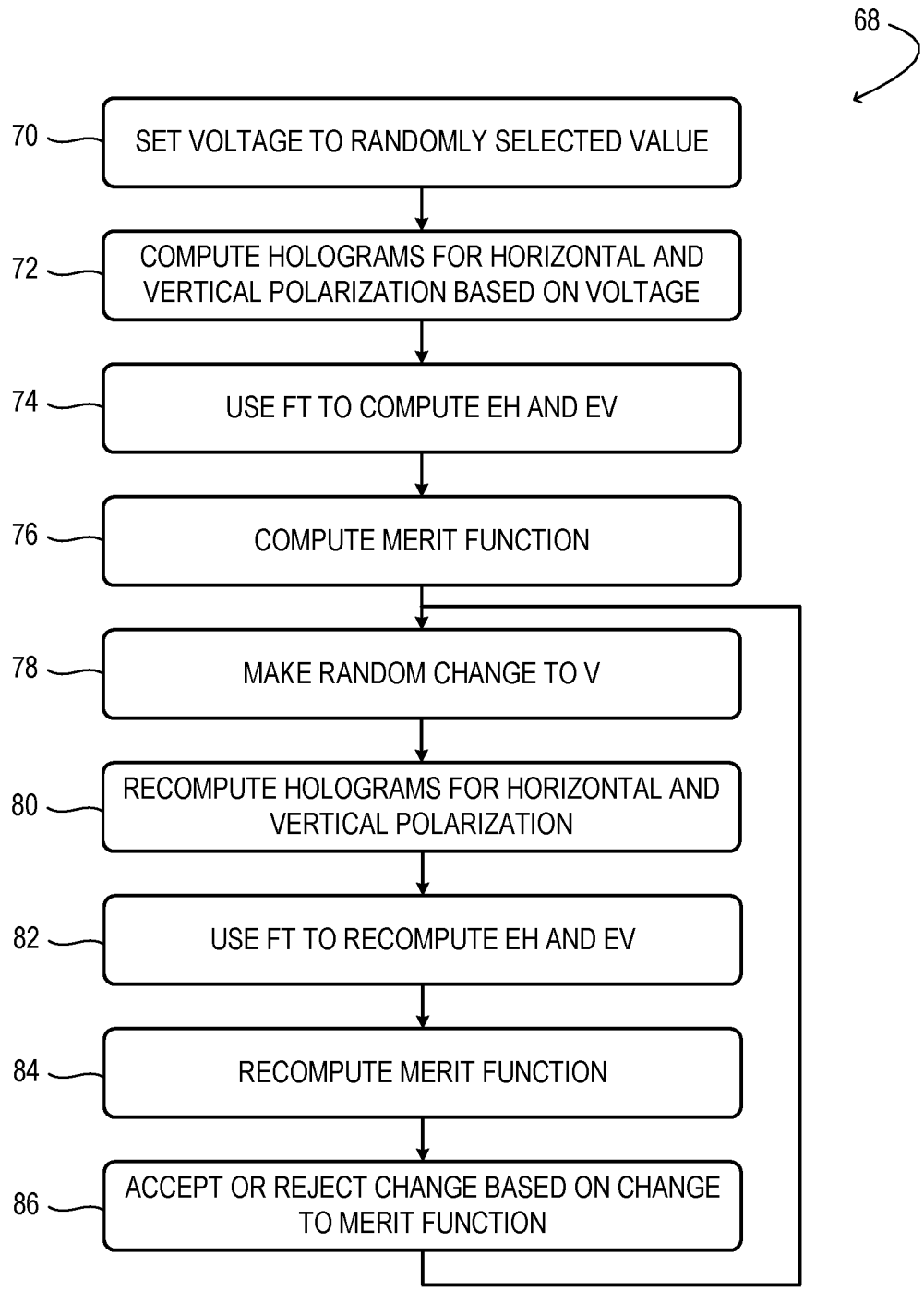

FIG. 9 illustrates an example holographic-design method 68 based on a modified Direct Binary Search (DBS) or 'simulated-annealing' algorithm. At 70 of method 68, the voltage matrix V(x,y) is set to a randomly selected value. At 72 is computed $H_v = f(V)$ and $H_h = f(V)$. At 74 is computed $E_h$ and $E_v$ using an FT. At 76 a merit function is computed. At 78 a random change to V(x,y) is made. At 80 are computed $H_v$ and $H_h$. At 82 are computed $E_v$ and $E_h$. At 84, a new merit function is computed. At 86, the random change made to V(x,y) is accepted or rejected in a probabilistic manner, based on whether the merit function has improved. Execution of algorithm 68 then returns to 78.

Returning briefly to FIG. 1, read head 90 of optical data storage and retrieval system 10 reads the data that has been stored on substrate 12 according to parameters supplied by read controller 92. The read data is then passed to decoder 94, which decodes and outputs the data to read buffer 96, from which output stream 98 is made available.

Figure 10:
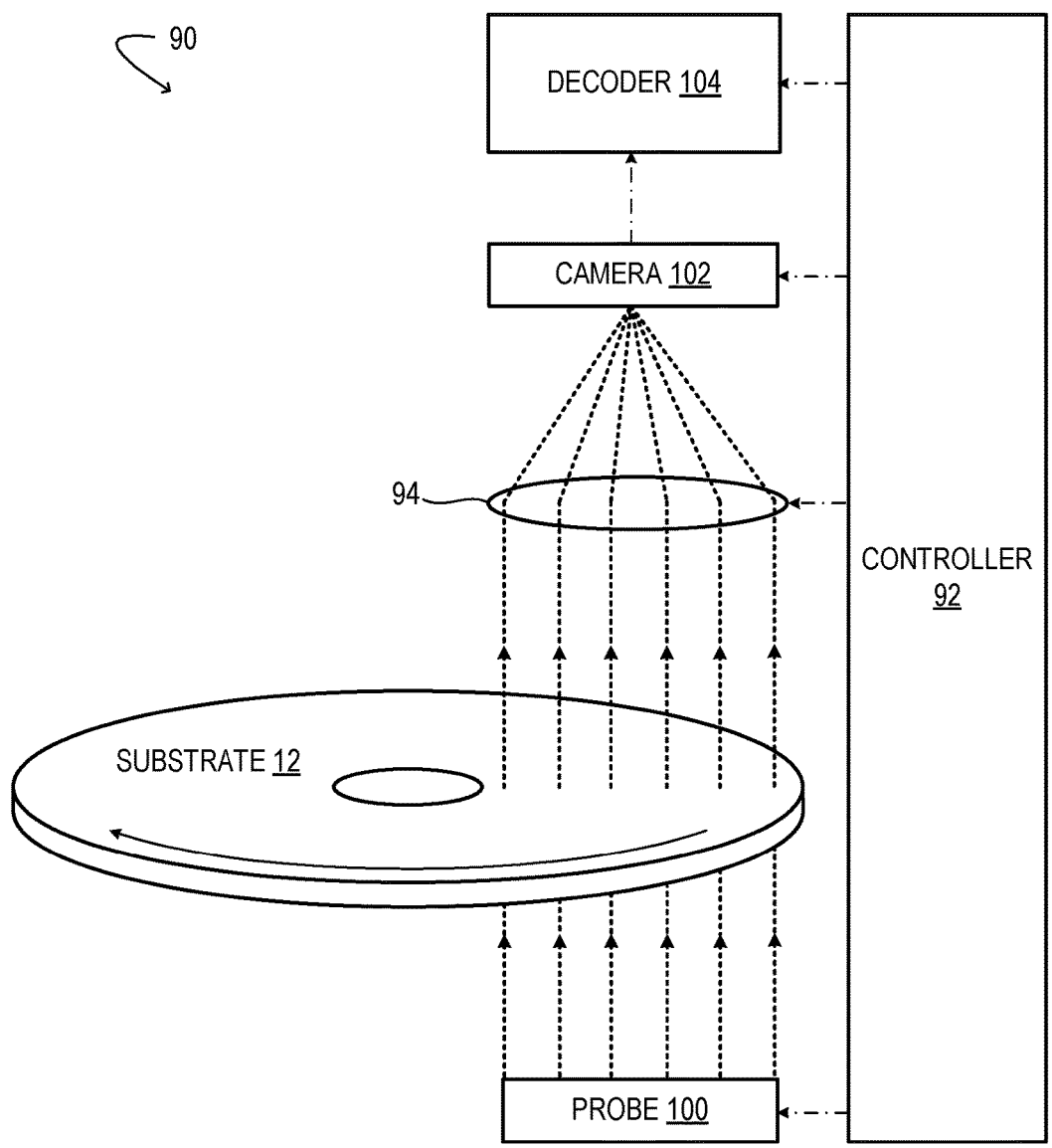
FIG. 10 shows aspects of an example read head of an optical data-storage and retrieval system.

FIG. 10 shows aspects of an example read head 90. The read head includes a polarized optical probe 100 and an analyzer camera 102. The polarized optical probe may include a low-power diode laser or other polarized light source. Read controller 92 is coupled operatively to the polarized optical probe and configured to control the angle of the polarization plane of emission of the polarized optical probe.

Analyzer camera 102 may include a high-resolution/high frame-rate CMOS or other suitable photodetector array. The analyzer camera is configured to image light from polarized optical probe 100, after such light has interacted with the voxels of substrate 12. Although FIG. 10 shows transmission of polarized light rays through the medium and on to the camera, the light rays may, in alternative configurations, reach the camera by reflection from the medium.

Each image frame acquired by analyzer camera 102 may include a plurality of component images captured simultaneously or in rapid succession. The analyzer camera may resolve, in corresponding pixel arrays of the component images, localized intensity in different polarization planes. To this end, the analyzer camera may include switchable or tunable polarization control in the form of a liquid-crystal retarder or Pockels cell, for example. In one particular example, four images of each target portion of substrate 12 are acquired in sequence by the analyzer camera as the polarized optical probe 100 is rotated through four different polarization angles. This process is akin to measuring basis vectors of a multi-dimensional vector, where here the 'vector' captures the birefringent properties of the voxels of the imaged target portion. In some examples, a background image is also acquired, which captures the distribution of sample-independent polarization noise in the component images.

In examples in which data is to be read from a plurality of layers of substrate 12, read head 90 may include an adjustable collection lens system 104. The adjustable collection lens system may collect light rays diffracted from a selected depth layer of the optical storage medium, and reject other light rays. In other implementations, lensless imaging based on interferometry may be employed.

In FIG. 10, data decoder 94 is configured to receive the component images from analyzer camera 102 and to enact the image processing necessary to retrieve the data stored in substrate 12. Such data may be decoded according to a machine-learned method and/or a canonical method in which an observable physical property is connected through one or more intermediates to the data read from the substrate.

The foregoing description and drawings should not be considered in a limiting sense, because numerous variations, extensions, and omissions are contemplated as well. For instance, while the LCSLMs described above are indeed suitable for modulating the phase and polarization of different portions of a wavefront by different amounts, and diffracting light from the different portions to a substrate, imaging optics of other types may also be suitable. Further, while optical data storage has been described in the context of an integrated read-write system (optical data storage and retrieval system 10), this disclosure is also consonant with various write-only systems in which data is written to a data-storage substrate that may be removed from the system and read elsewhere.

In some embodiments, the methods and processes described herein may be tied to a computer system of one or more computing devices. In particular, such methods and processes may be implemented as a computer-application program or service, an application-programming interface (API), a library, and/or other computer-program product.

Figure 11:
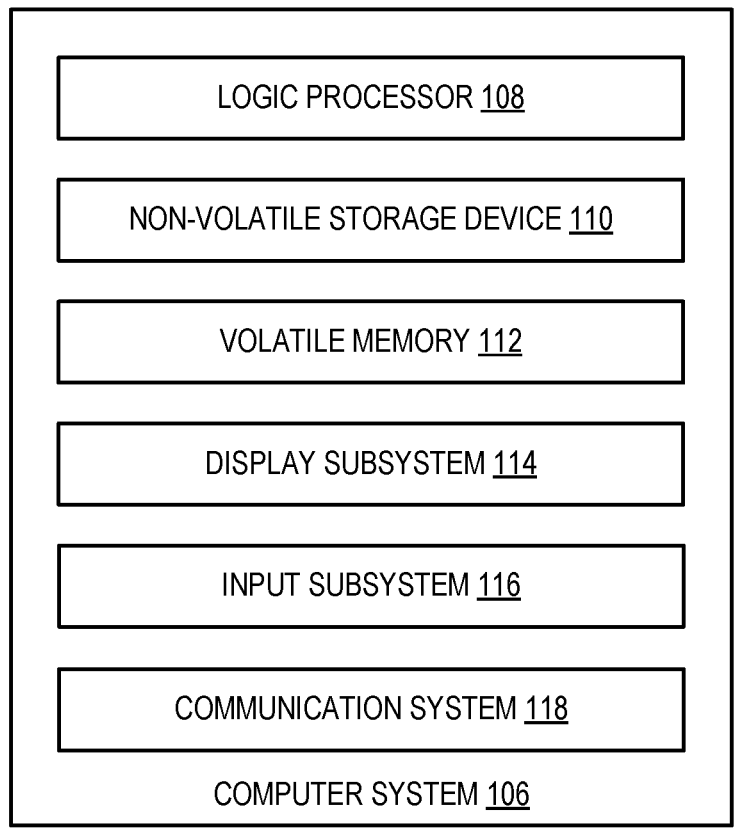
FIG. 11 shows aspects of an example computer system.

FIG. 11 schematically shows a non-limiting embodiment of a computer system 106 that can enact one or more of the methods and processes described above. Computer system 106 is shown in simplified form. Computer system 106 may take the form of one or more bench-top or server computers and/or dedicated electronic controllers. Encoder 18, controllers 22 and 92, and decoder 94 are examples of a computer system 106.

Computer system 106 includes a logic processor 108 volatile memory 112, and a non-volatile storage device 110. Computer system 106 may optionally include a display subsystem 114, input subsystem 116, communication subsystem 118, and/or other components not shown in FIG. 10.

Logic processor 108 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 108 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 110 includes one or more physical devices configured to hold instructions executable by the logic processors to implement the methods and processes described herein. When such methods and processes are implemented, the state of non-volatile storage device 110 may be transformed—e.g., to hold different data.

Non-volatile storage device 110 may include physical devices that are removable and/or built-in. Non-volatile storage device 110 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 110 may include nonvolatile, dynamic, static, read/write, read-only, sequential-access, location-addressable, file-addressable, and/or content-addressable devices. It will be appreciated that non-volatile storage device 110 is configured to hold instructions even when power is cut to the non-volatile storage device 110.

Volatile memory 112 may include physical devices that include random access memory. Volatile memory 112 is typically utilized by logic processor 108 to temporarily store information during processing of software instructions. It will be appreciated that volatile memory 112 typically does not continue to store instructions when power is cut to the volatile memory 112.

Aspects of logic processor 108, volatile memory 112, and non-volatile storage device 110 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (Sac), and complex programmable logic devices (CPLDs), for example.

When included, display subsystem 114 may be used to present a visual representation of data held by non-volatile storage device 110. The visual representation may take the form of a graphical user interface (GUI). As the herein described methods and processes change the data held by the non-volatile storage device, and thus transform the state of the non-volatile storage device, the state of display subsystem 114 may likewise be transformed to visually represent changes in the underlying data. Display subsystem 114 may include one or more display devices utilizing virtually any type of technology. Such display devices may be combined with logic processor 108, volatile memory 112, and/or non-volatile storage device 110 in a shared enclosure, or such display devices may be peripheral display devices.

When included, input subsystem 116 may comprise or interface with one or more user-input devices such as a keyboard, mouse, touch screen, etc. When included, communication subsystem 118 may be configured to communicatively couple various computing devices described herein with each other, and with other devices. Communication subsystem 118 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computer system 106 to send and/or receive messages to and/or from other devices via a network such as the Internet.

Another example provides an optical data-storage system, comprising a laser configured to emit a sub-picosecond pulsed wavefront having uniform phase and polarization; an imaging optic configured to modulate the phase and polarization of different portions of the wavefront by different amounts, and to diffract light from the different portions to a substrate with writeable optical properties; and operatively coupled to the imaging optic, logic configured to receive data and to control modulation of the phase and polarization such that the light diffracted from the imaging optic writes the data to the substrate.

In some implementations, the imaging optic is configured to modulate the different portions of the wavefront to different near-field polarizations and to image the light to an array of substrate voxels at different far-field polarizations. In some implementations, the data includes inequivalent first and second data values written simultaneously by the light diffracted from the imaging optic, the first data value is written to a first voxel by light of a first far-field polarization, and the second data value is written to a second voxel by light of a second far-field polarization. In some implementations, each data value written to the substrate is characterized by one of $R \geq 1$ different amplitude values of the diffracted light at each of $Q \geq 1$ different far-field polarizations. In some implementations, the each of $Q \geq 1$ different far-field polarization determines a slow axis orientation at the voxel where the data value is written, and the one of $R \geq 1$ different amplitude values determines a retardance at the voxel where the data value is written. In some implementations, the substrate comprises glass. In some implementations, the pulsed wavefront comprises pulses of 100 femtoseconds or less. In some implementations, the imaging optic is a liquid-crystal spatial light modulator (LCSLM) having an array of pixel elements configured to modulate the phase and polarization of different portions of the wavefront by different amounts, and to diffract the light from the different portions to the substrate. In some implementations, the LCSLM includes two independently addressable electrodes per pixel element and is configured to modulate the phase independent of the polarization. In some implementations, the imaging optic is configured to modulate the phase in correlation with the polarization. In some implementations, the logic is configured to execute a holographic-design algorithm to control modulation of the phase and polarization.

Another example provides an optical data-storage system, comprising a laser configured to emit a pulsed wavefront having uniform phase and polarization; a liquid-crystal spatial light modulator (LCSLM) having an array of pixel elements configured to modulate the phase and polarization of different portions of the wavefront by different amounts, and to diffract light from the different portions to a substrate with writeable optical properties; and operatively coupled to the LCSLM, logic configured to receive data and to control modulation of the phase and polarization such that the light diffracted from the LCSLM writes the data to the substrate.

In some implementations, the LCSLM is configured to modulate the different portions of the wavefront to different near-field polarizations and to image the light to an array of substrate voxels at different far-field polarizations, the data includes inequivalent first and second birefringence values written simultaneously by the light diffracted from the LCSLM, the first birefringence value is written to a first voxel by light of a first far-field polarization, and the second birefringence value is written to a second voxel by light of a second far-field polarization. In some implementations, the LCSLM is configured to modulate the phase in correlation with the polarization. In some implementations, the logic is configured to execute a holographic-design algorithm to control modulation of the phase and polarization. In some implementations, the holographic-design algorithm is based on a Gerchberg-Saxton algorithm. In some implementations, the holographic-design algorithm is based on a Direct Binary Search algorithm. In some implementations, the optical data-storage system further comprises a polarization-modulating sheet arranged between the laser and the LCSLM, the polarization-modulating sheet comprising a tiling of cells arranged in registry with the pixel elements of the array, each cell configured to rotate the polarization of a portion of the wavefront passing through that cell.

Another example provides an optical data-storage system, comprising a laser configured to emit a pulsed wavefront having uniform phase and polarization; a liquid-crystal spatial light modulator (LCSLM) having an array of pixel elements configured to modulate the phase and polarization of different portions of the wavefront by different amounts, and to diffract light from the different portions to a substrate with writeable optical properties, each pixel element having first and second independently addressable electrodes; and operatively coupled to the first and second electrodes of each pixel element, logic configured to receive data and to control modulation of the phase and polarization such that the light diffracted from the LCSLM writes the data to the substrate.

In some implementations, an average voltage applied to the first and second electrodes of a pixel element of the LCSLM affects a phase of a first component of the portion of the wavefront passing through that element, and a differential voltage between the first and second electrodes affects a phase of a non-parallel second component of the portion of the wavefront passing through that element.

It will be understood that the configurations and/or approaches described herein are exemplary in nature, and that these specific examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An optical data-storage system, comprising:
a laser configured to emit a sub-picosecond pulsed wavefront having uniform phase and polarization;
an imaging optic configured to modulate the phase and polarization of different portions of the wavefront by different amounts, and to diffract light from the different portions to a substrate with writeable optical properties, the imaging optic being configured to modulate the different portions of the wavefront to different near-field polarizations and to image the light to an array of substrate voxels at different far-field polarizations; and
operatively coupled to the imaging optic, logic configured to receive data and to control modulation of the phase and polarization such that the light diffracted from the imaging optic writes the data to the substrate.

2. The optical data-storage system of claim 1 wherein the data includes inequivalent first and second data values written simultaneously by the light diffracted from the imaging optic, wherein the first data value is written to a first voxel by light of a first far-field polarization, and wherein the second data value is written to a second voxel by light of a second far-field polarization.

3. The optical data-storage system of claim 2 wherein each data value written to the substrate is characterized by one of $R \geq 1$ different amplitude values of the diffracted light at each of $Q \geq 1$ different far-field polarizations.

4. The optical data-storage system of claim 3 wherein the each of $Q \geq 1$ different far-field polarization determines a slow axis orientation at the voxel where the data value is written, and wherein the one of $R \geq 1$ different amplitude values determines a retardance at the voxel where the data value is written.

5. The optical data-storage system of claim 1 wherein the substrate comprises glass.

6. The optical data-storage system of claim 1 wherein the pulsed wavefront comprises pulses of 100 femtoseconds or less.

7. The optical data-storage system of claim 1 wherein the imaging optic is a liquid-crystal spatial light modulator (LCSLM) having an array of pixel elements configured to modulate the phase and polarization of different portions of the wavefront by different amounts, and to diffract the light from the different portions to the substrate.

8. The optical data-storage system of claim 7 wherein the LCSLM includes two independently addressable electrodes per pixel element and is configured to modulate the phase independent of the polarization.

9. The optical data-storage system of claim 1 wherein the imaging optic is configured to modulate the phase in correlation with the polarization.

10. The optical data-storage system of claim 1 wherein the logic is configured to execute a holographic-design algorithm to control modulation of the phase and polarization.

11. An optical data-storage system, comprising:
a laser configured to emit a pulsed wavefront having uniform phase and polarization;
a liquid-crystal spatial light modulator (LCSLM) having an array of pixel elements configured to modulate the phase and polarization of different portions of the wavefront by different amounts, and to diffract light from the different portions to a substrate with writeable optical properties; and
operatively coupled to the LCSLM, logic configured to receive data and to control modulation of the phase and polarization such that the light diffracted from the LCSLM writes the data to the substrate,
wherein the LCSLM is configured to modulate the different portions of the wavefront to different near-field polarizations and to image the light to an array of substrate voxels at different far-field polarizations, wherein the data includes inequivalent first and second birefringence values written simultaneously by the light diffracted from the LCSLM, wherein the first birefringence value is written to a first voxel by light of a first far-field polarization, and wherein the second birefringence value is written to a second voxel by light of a second far-field polarization.

12. The optical data-storage system of claim 11 wherein the LCSLM is configured to modulate the phase in correlation with the polarization.

13. The optical data-storage system of claim 11 wherein the logic is configured to execute a holographic-design algorithm to control modulation of the phase and polarization.

14. The optical data-storage system of claim 13 wherein the holographic-design algorithm is based on a Gerchberg-Saxton algorithm.

15. The optical data-storage system of claim 13 wherein the holographic-design algorithm is based on a Direct Binary Search algorithm.

16. The optical data-storage system of claim 11 further comprising a polarization-modulating sheet arranged between the laser and the LCSLM, the polarization-modulating sheet comprising a tiling of cells arranged in registry with the pixel elements of the array, each cell configured to rotate the polarization of a portion of the wavefront passing through that cell.

17. An optical data-storage system, comprising:
a laser configured to emit a pulsed wavefront having uniform phase and polarization;
a liquid-crystal spatial light modulator (LCSLM) having an array of pixel elements configured to modulate the phase and polarization of different portions of the wavefront by different amounts, and to diffract light from the different portions to a substrate with writeable optical properties, each pixel element having first and second independently addressable electrodes; and
operatively coupled to the first and second electrodes of each pixel element, logic configured to receive data and to control modulation of the phase and polarization such that the light diffracted from the LCSLM writes the data to the substrate,
wherein an average voltage applied to the first and second electrodes of a pixel element of the LCSLM affects a phase of a first component of the portion of the wavefront passing through that element, and wherein a differential voltage between the first and second electrodes affects a phase of a non-parallel second component of the portion of the wavefront passing through that element.

* * * * *